US005248086A

United States Patent [19]
Waldrum et al.

[11] Patent Number: 5,248,086
[45] Date of Patent: Sep. 28, 1993

[54] THIN INVERT COMPOSITIONS FOR SPRAY APPLICATION

[75] Inventors: John E. Waldrum; Roy R. Johnson, both of Ambler, Pa.

[73] Assignee: Waldrum Specialties, Inc., Doylestown, Pa.

[21] Appl. No.: 782,505

[22] Filed: Oct. 25, 1991

[51] Int. Cl.[5] ........................ B05D 1/02; B05B 1/02

[52] U.S. Cl. ........................ 239/10; 239/1; 239/171

[58] Field of Search ........................ 239/1, 10, 11, 171; 71/DIG. 1

[56] References Cited

U.S. PATENT DOCUMENTS

| | | | |
|---|---|---|---|
| 3,197,299 | 7/1965 | Stull et al. | 239/171 X |
| 3,499,606 | 3/1970 | Smith | 239/171 X |
| 3,592,385 | 7/1971 | Smith | 239/10 |
| 3,640,461 | 2/1972 | Koll | 239/10 X |
| 5,110,048 | 5/1992 | Waldrum | 239/171 |

*Primary Examiner*—Andres Kashnikow
*Assistant Examiner*—William Grant

*Attorney, Agent, or Firm*—Eckert Seamans Cherin & Mellott

[57] ABSTRACT

A thin invert composition and method for applying agricultural products to a target area with minimal drift or evaporation is based on a water and oil mixture which is emulsified by minimal agitation so as to provide a low viscosity emulsion. The emulsion, when sprayed through small spray orifices (e.g., 0.020 inch internal diameter) forms a thin invert wherein the water phase is enclosed in the oil phase and the droplet size is small (e.g., 1000 microns mean diameter) and uniform. The water phase carries a hydrophilic active agricultural product. The mixture can have 15 to 50% oil phase by weight, and 50 to 80% water phase by weight, the water phase containing the active hydrophilic product of up to 75% by weight of the water phase. According to the composition and the method disclosed, the surface tension of the droplets formed when spraying is the primary factor determining droplet size, and is kept small and uniform for thorough application to leafy surfaces and the like.

20 Claims, 2 Drawing Sheets

THIN INVERT COMPOSITIONS FOR SPRAY APPLICATION

BACKGROUND OF THE INVENTION

1. Field of the Invention

The present invention relates to a thin invert composition for carrying agricultural products to a target area, such as a field of growing crops, in the form of a spray of uniform small droplets. More specifically, the invention relates to low viscosity water and oil emulsions for carrying hydrophilic agricultural products such as herbicides, insecticides, fungicides and/or plant growth regulators.

2. Prior Art

Oil/water emulsions are known per se, and have been used for agricultural applications as a means to form larger droplets when the emulsion is sprayed, as compared for example to a dispersion of the agricultural product in water. A larger droplet has more inertia than a smaller one, and is less apt to drift. Drift is a problem, particularly in aerial application of the agricultural product, allowing a portion of the product to escape due to air currents carrying the product away from the target area, evaporation, etc. At worst the drifting product can pollute the environment, for example adversely affecting areas surrounding the area of intended application. At the least a portion of the product fails to reach the target crop or the like and is wasted.

A number of factors affect droplet size including the viscosity of the composition, its surface tension, the geometry and flow conditions of the spray apparatus which emits the composition, and the relative motion of the air stream into which the spray is emitted. These factors are interrelated. For example, a composition with a relatively high surface tension may be capable of forming a large droplet under optimal conditions, but under typical spray conditions the viscosity, spray geometry and/or flow conditions are so variable that the spray is broken up into a range of droplet sizes. The larger droplets tend to fall and the smaller droplets tend to drift. It is difficult to prevent the breakup of larger droplets into smaller ones, particularly considering the fact that the high viscosity of the composition needed to produce a large droplet size requires a large diameter flow path and spray orifice in order to flow properly. Moreover, viscosity varies with temperature, minor variations in water quality, agitation, etc.

The efficacy of the agricultural agent in the composition is affected by the droplet size. The general objectives when spraying are to coat the target area evenly and completely, and to apply the composition in a quantity per unit of area that will achieve the desired results. However, when the droplet size is large or variable these factors are also variable. With respect to leafy vegetation, for example, large droplets applied at a given quantity per unit area are more likely to spot the leaves than to coat them evenly. Therefore, large droplets may be helpful against drift but require a higher rate of application to achieve a given efficacy.

Some active agricultural products can be dispersed in either water or oil. However, many forms of vegetation have a more or less waxy surface which protects the plant from dehydration due to evaporation from the leaves. This waxy coating also interferes with the absorption of water into the leaves. Accordingly, spray compositions with water soluble agricultural products are often considered less advantageous than oil based compositions because the active ingredient can be blocked from penetrating the leaves due to the waxy coating.

Known oil/water emulsions, particularly when applied by aerial spraying, have additional drawbacks. When ambient temperatures rise, the more volatile media tend to evaporate from the emulsion more quickly, and may release the active agricultural product into the air rather than onto the target. When a droplet containing a mixture of a water soluble active ingredient, water and oil is sprayed, at least some of the water on the surface of the droplet tends to evaporate or separate from the droplet, thereby wasting the agricultural product and impeding drift control. Under such circumstances, the droplets (primarily remaining oil) are reduced in size and can float more readily in the air and be carried from the target by the wind.

As mentioned above, the droplet size of a sprayed composition can be increased by using a thick so-called "invert." An invert is an emulsion characterized by droplets having a film of oil surrounding one or more water particles, and thick inverts are viscous compositions of this type. The oil phase surrounding the water phase reduces the evaporation of the water and consequent loss of the active ingredient. However, thick invert emulsions form non-uniform droplets when sprayed. Due to the large and non-uniform character of the droplets, thick inverts require higher spray volumes per unit of area to achieve a given efficacy than might be obtained with smaller droplets of a uniform size, which can more evenly coat the leaves A typical thick invert may require application rates of 25 to 100 gallons per acre.

A known, boom-type aerial agricultural spray device is disclosed in U.S. Pat. No. 5,110,048 which is hereby incorporated. A plurality of orifices are provided on the trailing edge of an airfoil shaped conduit which is elongated transverse to the direction of travel of an aircraft, for example on the front of the skids of a helicopter or below the wing of a fixed-wing aircraft. The orifices are arranged on nozzles which are wedge-shaped along their trailing edge, each having a valve coupled to a port which protrudes at a fitting on the leading edge of the airfoil.

A conventional delivery system is characterized by substantial disturbance of the laminar flow of air passing the aircraft or the like. The disturbance and eddies interfere with formation of uniform droplets. This is particularly true when a conventional boom is used with fixed-wing aircraft (where turbulence generated by the wing further disturbs the laminar flow around the spray boom). The conventional device emits the liquid in a distribution of larger and smaller droplets. Droplets larger than optimum require high application rates. Droplets smaller than optimum tend to drift. In all, the known device is largely subject to drift and waste.

Assuming that a uniform application of small droplets can be accomplished, the volume of material applied to a site to be treated can be reduced. With more accurate application, a more concentrated agent can be applied safely. Smaller, lighter equipment can be used to apply the material, and the effectiveness of the agent is improved. Moreover, when the small droplets can be formed as an invert with a water phase enclosed in an oil surface layer, problems with evaporation are reduced. Moreover, the oil assists in penetration of the waxy surface of vegetation, and the overall efficacy of the chemical agent is improved.

According to the invention, a composition is provided which can be readily applied through small orifice spraying devices arranged to form uniform small droplets. The orifices are capillary sized in relation to the composition viscosity and surface tension. The composition is low in viscosity and is agitated to maintain the oil and water against separation or to reconstitute the emulsion after separation. This is accomplished, for example, by recirculating the composition in the spray apparatus, using the spray pump or an auxiliary pump associated with the spray apparatus. The agitation converts the oil and water phases into a thin invert which produces a droplet having an oil phase over a water phase, the oil phase providing protection against evaporation of the water phase, and producing surface tension characteristics needed to maintain droplet size.

Together with a novel spray apparatus as disclosed in a commonly owned and concurrently filed application entitled Delivery Apparatus for Thin Invert Emulsions, the composition of the invention produces uniform small droplets that provide excellent efficacy in low volume application. The viscosity of the composition is low, as appropriate for emission through numerous small orifices to form small droplets. The viscosity of the composition can also be controlled by regulating the extent of agitation. Therefore, problems with separation of the oil and water portions of the formulation are overcome, allowing an invert solution to be applied in uniform small droplets. In connection with aerial spraying, a plurality of wedge shaped nozzles along an aerodynamically shaped conduit are each provided with trailing small tubes leading to an internal manifold coupled to the conduit at a check valve. A pump coupled between a storage reservoir and an end of the conduit pressurizes the conduit to open the check valves and commence application of the product. A second conduit runs along the conduit and is preferably disposed inside the conduit. The second conduit is arranged in a recirculation path adapted to agitate the material in the system to prevent separation and to regulate the viscosity of the composition, which varies with agitation, temperature and ingredients.

SUMMARY OF THE INVENTION

It is an object of the invention to provide a thin invert composition for the application of agricultural products to a target in the form of uniform small droplets of oil on water.

Another object of the invention is to provide a thin invert composition which together with a recirculating delivery system reduces the incidence of drift in aerial spray applications.

Still another object of the invention is to provide a thin invert system which may be used with water soluble and water miscible agricultural products.

Another object of the invention is to provide a thin invert system capable of using hydrophilic product.

Yet another object of the invention is to provide a thin invert system that prevents unwanted evaporation of agricultural product prior to deposition on the target area.

It is a further object of the invention to provide a thin oil/water invert composition arranged such that the surface tension of the liquid is the primary effect determining droplet size, which can be applied through small orifices for delivery of uniform small droplets.

These and other objects of the invention are achieved by providing a thin invert composition according to the invention and a method of applying the composition, preferably comprising a hydrophilic product with an invert oil coating, substantially without drift to a target area. The hydrophilic product is present in the water phase of an oil/water mixture which is agitated to form an emulsion. The emulsion is particularized by delivery through small orifices to produce substantially uniform droplets having a maximum mean droplet diameter of about 1000 micrometers. The droplets comprise an invert emulsion, i.e., the oil phase surrounds the water phase, which water phase contains the hydrophilic product. The viscosity is low enough to permit droplet formation through a nozzle having an orifice size of at most about 0.02 inches and at a flow rate of about 0.1 liters per minute per orifice and at ambient temperatures of about 60–90 degrees F. The droplets are applied to a target area, for example, by aerial spraying onto growing crops and plants, such as fruits, vegetables and weeds.

The invention makes possible the use of water soluble and water miscible agricultural products in aerial sprays with reduced drift, evaporation and acceptable leaf wetting and penetration at relatively low application rates, such as 1–5 gallons per acre.

The capability of agitating the liquid agent by recirculating the agent in the system prevents separation of the oil and water phases. Even after a period of inactivity the agent can be reconstituted by operating the recirculating means.

These and other advantages of the invention will become more readily apparent a the following detailed description of the invention proceeds.

BRIEF DESCRIPTION OF THE DRAWINGS

There are shown in the drawings the embodiments of the invention as presently preferred. It should be understood that the invention is capable of embodiment in a number of specific arrangements in accordance with the disclosure herein, and reference should be made to the appended claims rather than the discussion of exemplary embodiments to better access the scope of the invention in which exclusive rights are claimed. In the drawings.

DETAILED DESCRIPTION OF THE PREFERRED EMBODIMENTS

Figure 1:
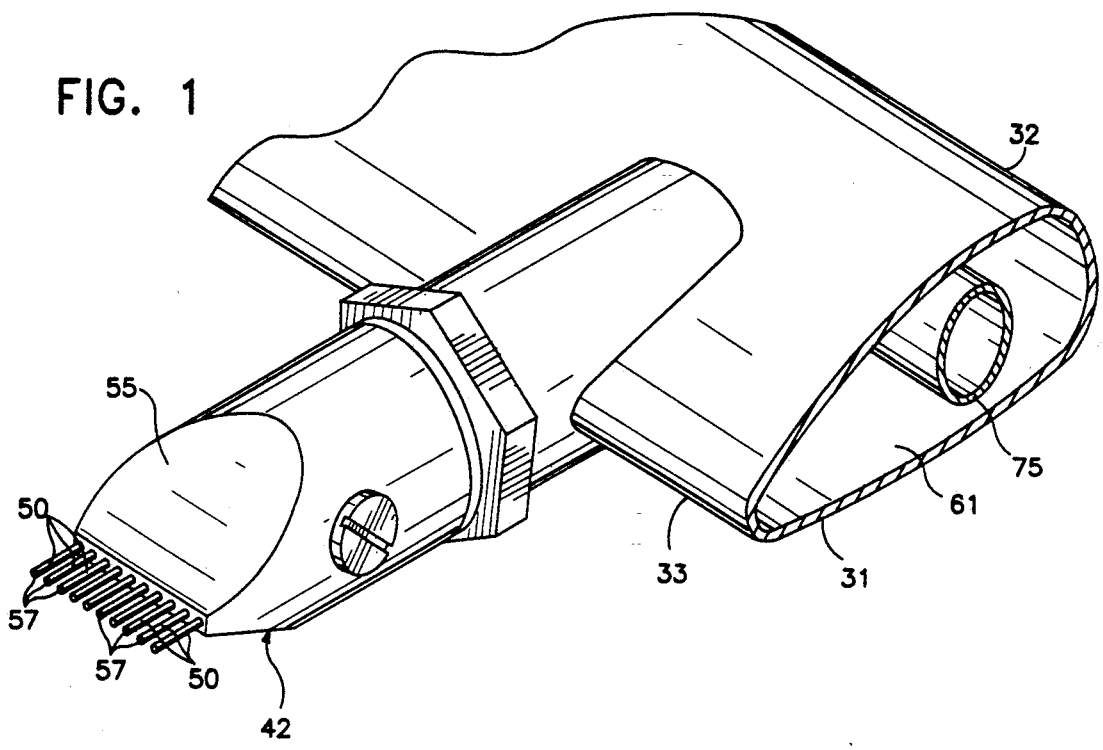
FIG. 1 is a partial cutaway perspective view of a spray boom, internal conduit and one nozzle according to the delivery system for the composition according to the invention.

The present invention relates to a thin invert composition and method of preparing and applying the same, for example to apply agricultural chemical to a target area. As used herein, the term "thin invert" refers to water and oil compositions which are agitated to obtain an emulsion. With application of the composition, for example by pumping the composition through numerous small orifices of about 0.020 inches internal diameter, the water and oil phases become "inverted" in that the oil phase surrounds the water phase. Whereas the orifices are small and the composition thin in viscosity, the composition forms droplets of about 1000 micrometers maximum mean diameter, having an oil phase surrounding a water phase. At an application rate of about 0.1 liters per minute per orifice, at ambient temperatures of 60–90 degrees F., the composition is effective and advantageous for carrying hydrophilic agricultural chemicals to a target area.

The thin invert of the present invention is prepared by selecting a low viscosity inverting oil, such as naphthenic, paraffinic or vegetable oil, and adding water to the oil. The oil can be non-phytotoxic, e.g., SURFEL, SUN II E, or SUN II N, if the object is application of the agricultural product to growing food crops and the like. The ratio of oil to water is preferably about 1:3 to about 1:5, although higher ratios of oil to water may be employed, the primary disadvantage being the increased cost associated with using more oil. The lower limit of oil is dictated by emulsion viscosity, because reducing the concentration of oil tends to increase the viscosity of the emulsion when agitated, due to frothing in a manner similar to the formulation of mayonnaise.

Preferably the invert composition is prepared from a mixture of 15 to 50% oil phase by weight, 1 to 5% emulsifier/surfactant by weight, and 50 to 80% water phase by weight, said water phase containing an active hydrophilic product of up to 75% by weight of said water phase. The emulsion is prepared from this mixture using known agitation methods, such as whipping the oil/water mixture to create the emulsion. A preferred method is to agitate the emulsion using the shearing action of a centrifugal pump. The centrifugal pump can be arranged in a recirculating conduit system or in a valved arrangement wherein the pump recirculates the composition when not spraying, to maintain the viscosity at a level which forms the desired droplet size, i.e., about 1000 microns maximum mean diameter when emitted through an orifice having an internal diameter of about 0.020 inches. While not critical, it may be advantageous to employ known emulsifiers to ensure a good emulsion, and to permit further control of the viscosity.

The active agricultural product or products to be applied to the target can be mixed into composition after the emulsion is formed. While either oil soluble or water soluble agricultural products could be used, it is preferred that hydrophilic products be employed because in the invert droplet the water phase is enclosed, and thereby protected, by the oil phase.

As used herein, the term "hydrophilic product" means any water soluble or water miscible composition which may be used in aerial spraying applications. Preferably, when used as an agricultural product, the hydrophilic product of the present invention is selected from the group of hydrophilic herbicides, insecticides, fungicides and plant growth regulators. The hydrophilic product may be an amine or an ester or other water miscible product. The following is a representative listing of the hydrophilic product which may be used in accordance with the present invention, but is not intended to be all-inclusive or self-limiting. Of course more than one hydrophilic product maybe used simultaneously, it being preferred that compatible hydrophilic products be used, or that incompatible products be made more compatible with known compatibility agents.

| Herbicides | Insecticides |
|---|---|
| 2,4-D | chlorpyriphos |
| dicamba | carbaryl |
| triclopyr | methomyl |
| imazapyr | |
| glyphosate | |
| sulfmeturon methyl | |
| fluridone | |
| clopyralid | |
| picloram | |
| hexazinone | |
| Plant Growth Regulators | Fungicides |
| ethephon | benomyl |
| fosamine | ferbam |
| | zineb |

A typical composition of thin invert emulsion as used according to the present invention comprises, by weight, about 15–30% oil, 50–70% water, 5–25% hydrophilic products, 1–5% emulsifier and 0.2–5% other additives, such as for example surfactants, pH adjustors, odor masking agents and ingredient compatibility enhancers.

A highly preferred embodiment of the invention comprises about 22.5% heavy aromatic naphtha, 2.5% fatty acid amide and surfactant blend, 0.25% polyalkyleneoxide modified heptamethyltrisiloxane, 24.75% hydrophilic product, such as triclopyr (3, 5, 6-trichloro-2-pyridinyloxy acetic acid), (as the triethylamine salt) and 50.0% water. The siloxane additive is a surfactant which promotes droplet spreading on the leaf surface.

Figure 4:
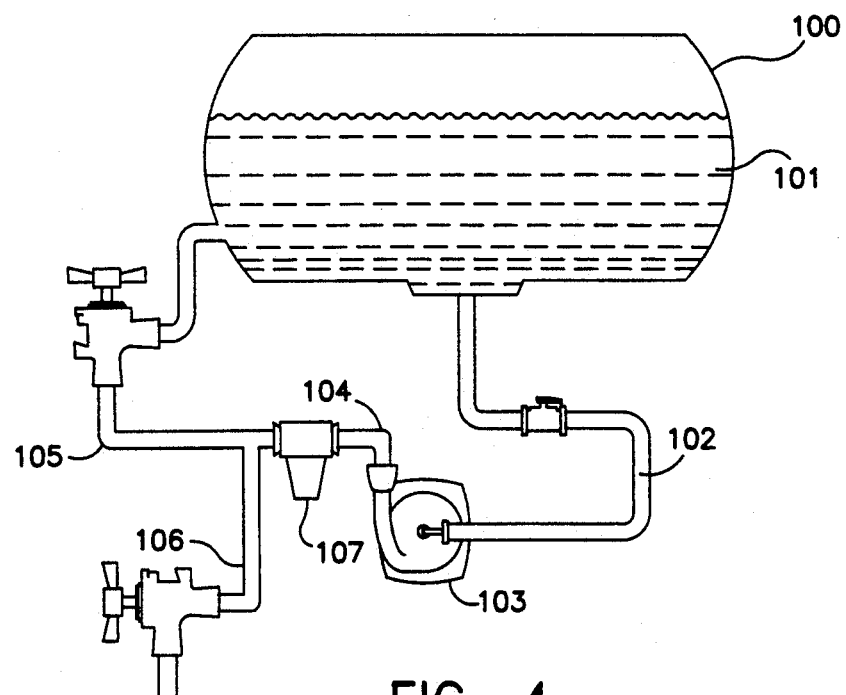
FIG. 4 is a schematic elevation view illustrating an alternative embodiment of the recirculating pump system.

FIG. 4 illustrates the type of equipment which may be used in preparing the thin inverts of the present invention. A illustrated, a tank, generally 100, contains the emulsion components 101, in the proportions described herein. A feed line 102 conveys the emulsion components to a centrifugal pump 103, which forms the emulsion through its shearing action through the oil and water components. The emulsion exits the pump 103 through line 104 and may either be recycled for additional shearing through a recirculation line 105, until a thin invert emulsion is formed, or may be diverted through an outlet line 106 for end use application (e.g., to a spray nozzle) or for storage once the thin invert emulsion forms. A line strainer 107 may be placed in the line 104 to remove clumps or oversized particles or dirt from the emulsion.

The thin invert droplets achieved by the method of the invention are applied in known manner to the target, for example by aerial spraying or ground spraying.

The emulsion used in practicing the invention should be stable, low viscosity (i.e., as close to that of water as possible), and should be capable of being reconstituted. Furthermore, in emulsifying or applying the emulsion, undue agitation or cavitation should be avoided. Therefore, the emulsion should be its thickest at the point of release, preferably at a valve leading to the final orifice, the valve being open at about 20–30 psi rather than 7–10 psi as with diaphragm valves.

Once formed, the thin invert of the invention may be applied to a target area, provided the small droplet sizes of the invention are produced by the particular equipment used. It is preferred that the invention be practiced by applying the emulsion to the target in substantially uniform droplets of 1000 micrometers maximum mean diameter, rather than as a stream or string of fluid or in a wide assortment of droplet sizes. In order to achieve application of thin oil/water inverts in the form of uniform small droplets, it is necessary to address the character of the solution, and in particular its viscosity, as well as the character of the pumps and flow paths defined between an inlet and an outlet.

The outlet structure 42 as shown in FIG. 1 provides a plurality of small outlet openings 57, which are capillary sized as compared to the viscosity of the chemical agent, coupled to a delivery system which includes means for recirculating the solution in order to reverse separation of the oil and water phases, by agitation.

Figure 2:
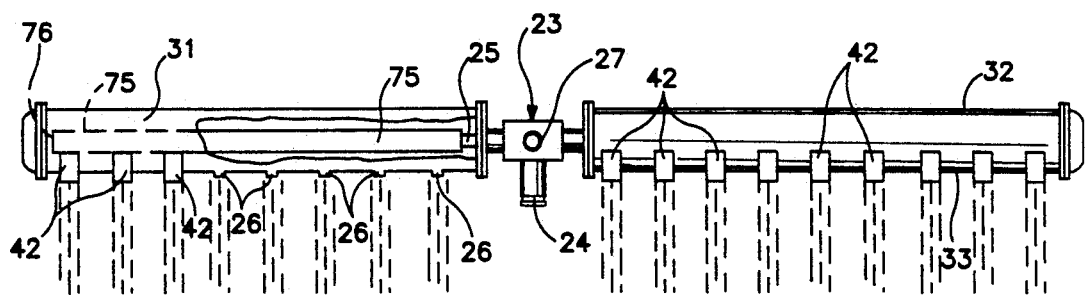
FIG. 2 is a partial plan view illustrating an exemplary boom arrangement, partially cut away to show the internal conduit.
Figure 3:
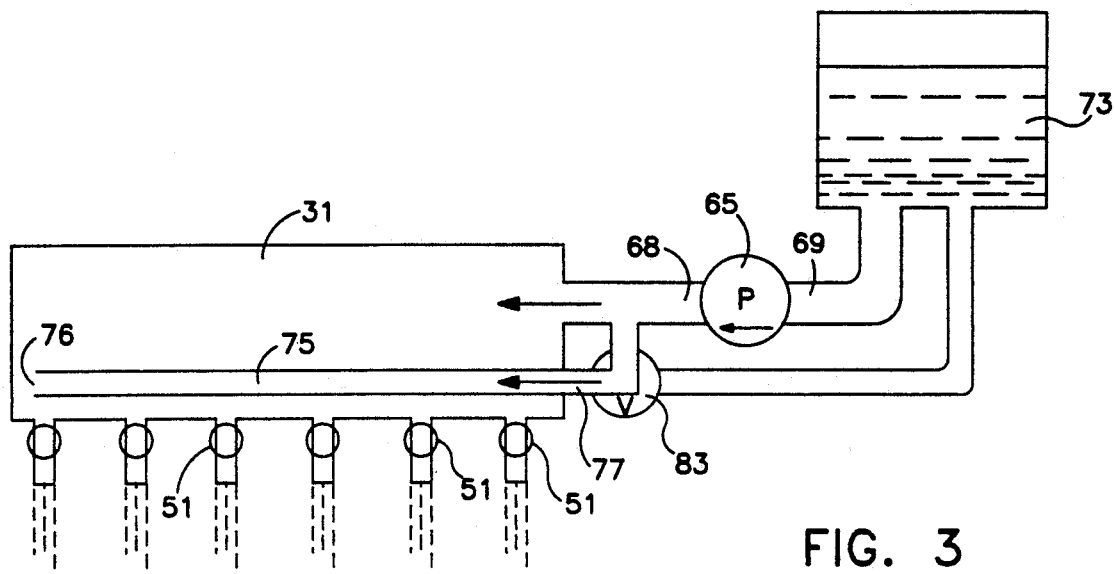
FIG. 3 is a schematic diagram illustrating a recirculating pump arrangement for controlling composition viscosity via agitation.

With reference to FIGS. 1-3, the delivery system for a liquid chemical agent or agricultural product includes a reservoir 73 for storage of the agent in liquid form. The reservoir 73 can be, for example, a tank on an aircraft or ground vehicle, with sufficient storage capacity to hold a convenient quantity of solution to be dispensed before refilling. With known chemical agent delivery systems which are not structured for drift control or which control drift with thick oil/water inverts (i.e., using large droplets), a supply of 25 to 50 gallons may be needed to treat an acre of ground. According to the invention a smaller quantity is needed, because a uniform application of small droplets of a thin invert or the like is substantially more efficacious. Two to four gallons of liquid agent are generally sufficient to treat an acre. A tank on the order of twenty to fifty gallons capacity will normally be sufficient to hold a convenient amount of liquid agent.

A first conduit 31 has a plurality of spray nozzles 42 defining outlet orifices 57. The nozzles and their orifices are disposed along a length of the first conduit 31 and are in each case, coupled to the first conduit through at least one check valve 51. Pump means 65 (see FIG. 3) is coupled to the first conduit 31 for delivering the agent from the reservoir 73 to the first conduit 31 under pressure sufficient to open check valves in the nozzle structure 42 and thereby emit the agent through the orifices 57 of the nozzles.

A second conduit 75 is disposed within the first conduit 31. The first and second conduits communicate with the reservoir via nipples 24, 27 of central fitting 23. The second conduit 75 has an inlet 77 communicating with the reservoir 73 and an outlet 76 remote from the inlet along the length of the first conduit 31. A valve 83 and pump 65 configuration (FIG. 3), and/or a particular pump arrangement (not shown) are controllable for pumping the agent from the first conduit 31 at a point remote from the outlet 76 of the second conduit 31 to the reservoir 73 in a recirculating mode of the device. This reverse biases check valves 51 at the nozzles 42 and closes the nozzle outlets 57 while recirculating the agent. As a result the agent is agitated and the oil/water phases are mixed throughout the system, including the contents of the first and second conduits.

As shown in FIGS. 1 and 2, the second conduit 75 can be disposed directly within the first conduit 31. The first and second conduits 31, 75 thus define a first passageway 61 between an outside of the second conduit 75 and an inside of the first conduit 31, and a second passageway within the second conduit 31. The nozzle orifices 57 are coupled to the first passageway 61. By reversing the pump-powered flow it is possible according to the invention as shown to flush the first conduit 31 in the recirculating mode. In the regular discharge mode, the pressure drop which would occur along the first conduit 31 from its inlet to the most remote of the nozzles is minimized because the second conduit (which does not have orifices along its length) boosts the pressure within the first conduit at the area adjacent the outlet of the second conduit, i.e., at the end of the first conduit remote from the inlet which is coupled to the pump.

In an aerial spraying embodiment, the first conduit 32 preferably comprises an elongated boom with an aerodynamic cross section as shown in FIG. 1. The leading edge 32 of the boom is smooth, and the nozzles 42 and orifices 57 are spaced along a trailing edge 33 of the boom. The boom can be sectional as shown in FIG. 2, with threaded rearward stubs 26 for attaching the nozzles 42 to the boom in a manner that does not substantially disturb a smooth laminar flow of air over the boom. As a result, the air flow characteristics over the boom have less of an effect on the droplet size than does the surface tension characteristic of the oil-on-water droplets emitted from the nozzles 42. It is an important objective of the invention to provide an arrangement wherein the surface tension of the emitted liquid is a primary parameter affecting the formation of droplets and this is achieved in part using the aerodynamic shapes as shown, which do not disturb the laminar flow of air over the boom or first conduit 31. The nozzle orifices are defined by small tubes 50 terminated at orifices 57, disposed at a distance from the body and wedge shaped terminus 55 of the nozzle 42. The wedge shaped terminus defines a horizontal line of outlet openings 57.

Referring to FIG. 3, the means for delivering the agent from the reservoir 73 to the first conduit or boom 31 includes at least one pump 65 coupleable to the reservoir 73. There are a number of ways in which the at least one pump can be arranged, in order to pump the liquid into both the first and second conduits for discharging the liquid by opening the check valves, and also to recirculate the liquid through the system with the check valve closed, and thus to agitate the liquid and keep it in proper suspension.

In the embodiment shown in FIG. 3, the pump 65 can be associated with a valve means 83, shown schematically. The valve means 83 and pump 65 direct the flow from the reservoir 73 into both the boom 31 and the second conduit 75 in the discharge mode. In that case the inlet 64 to the pump 65 is coupled to the reservoir and the outlet 68 is coupled to both conduits. Although a pressure drop would normally be experienced along the boom 31 due to the orifices along the boom, which are opened with sufficient pressure to open the check valves. However, by directing flow into both conduits, the pressure at the outlet 76 of the inside (second) conduit 75 tends to remain near the pressure at the inlet 77 to conduit 75. This keeps the pressure at the respective nozzles more constant.

The pump and valve means in the discharge or delivery mode can control flow of the agent into both the first conduit and the second conduit in parallel. In a recirculating mode, however, the position of the valve means and/or the operation of the pump are changed, to control flow into one of said first and second conduit only. The other of the first and second conduit being coupleable to the reservoir for recirculating the agent along a path including the first and second conduit in series. The pump optionally can be arranged to produce a negative pressure in the first conduit in the recirculating position of the valve means, i.e., having an inlet to the pump coupled to the boom or first conduit, and an outlet coupled to the reservoir. Assuming that check valves are provided in nozzles, as preferred, this embodiment positively prevents leakage of the agent from the boom, even if outlet orifices are open due, for example, to removal of an outlet check valve for servicing, or due to one of the outlet valves being stuck open. Loss of the agent is prevented because negative pressure in the conduit draws air in through the open outlet rather than allowing the agent to flow out. It is also possible in this manner to drain the conduit into the tank, i.e., by closing the return flow path from the tank to the conduit and allowing ingress of air through a valve disposed in the surface of the conduit. There are a number of alternative arrangements of one or more pumps and valves that are possible to achieve selectable operation in a discharge mode and a recirculating mode, the composition being agitated in the recirculating mode for control of viscosity.

The choice of a positive displacement pump or a centrifugal pump is dictated to some extent by the character of a liquid agent to be discharged. In connection with thin invert emulsions, the viscosity of the liquid is increased with agitation, and it is desirable to keep the emulsion thin enough to be readily discharged through the capillary sized orifices in the nozzles, while agitating sufficiently to prevent separation of the oil and water (i.e., to maintain the oil/water emulsion). It is possible to monitor the back pressure of the flow, for example the back pressure on the nozzles, in connection with a control system for varying the time period or frequency of agitation in an ongoing manner, to control the viscosity of the composition, and therefore to control the discharge rate, viscosity and droplet size.

The present invention has been described above in terms of representative examples and illustrative descriptions, which are merely particular embodiments of the invention and the invention is defined more generally by the following claims and their equivalents. While many objects and advantages of the invention have been set forth, it is understood and intended that the invention be defined by the scope of the following claims, not by the objects and advantages. For example, although particular apparatus useful in practicing the claimed method have been set forth, it is understood that other apparatus could be employed to perform the same method without deviating from the scope of the claims.

We claim:

1. A composition for application of active agricultural agents, comprising:

a mixture of 15 to 50% oil phase, 1 to 5% emulsifier/-surfactant, and 50 to 80% water phase, said water phase containing an active hydrophilic product of up to 75% by weight of the water phase, said oil phase, emulsifier/surfactant, water phase and hydrophilic product being disposed in an emulsion, wherein the mixture has a viscosity sufficient to produce droplets of about 1000 micrometers mean maximum diameter when pumped through a capillary sized orifice, whereby the emulsion forms a thin invert when sprayed for application of the hydrophilic product to a target area.

2. The composition according to claim 1, further comprising up to 5% by weight of at least one additive regulating an attribute of the composition selected from the group consisting of viscosity, surface resistance, pH, odor, and intra-ingredient compatibility.

3. The composition according to claim 2, wherein the additive includes at least one of an emulsifier and a surfactant.

4. The composition according to claim 1, wherein the active hydrophilic product is selected from the group consisting of an herbicide, an insecticide, a fungicide and a plant growth regulator.

5. The composition according to claim 4, wherein the active hydrophilic product is selected from the group consisting of 2,4-D, dicamba, triclopyr, imazapyr, glyphosate, sulfometuron, methyl, fluridone, clopyralid, picloram, hexazinone, chlorpyriphos, carbaryl, methomyl, ethephon, fosamine, benomyl, ferbam and zineb.

6. The composition according to claim 1, wherein the mixture has a viscosity sufficient to provide droplets of about 1000 microns mean maximum diameter when pumped through an orifice of about 0.020 inches at a flow rate of about 0.1 liters per minute.

7. The composition according to claim 1, wherein the active hydrophilic product comprises a water soluble or water miscible amine.

8. The composition according to claim 1, wherein said oil phase comprises an oil selected from the group consisting of naphthenic oils, paraffinic oils and vegetable oils.

9. The composition according to claim 1, wherein said emulsion comprises, by weight, about 15-30% oil, 50-70% water, 5-20% hydrophilic product and 1-5% emulsifier.

10. The composition according to claim 1, wherein the emulsion comprises by weight about 22.5% heavy aromatic naphtha, about 2.5% fatty acid amide, a surfactant comprising about 0.25% polyalkyleneoxide modified heptamethyltrisiloxane, about 24.75% said active hydrophilic product, and about 50.0% water.

11. A method of applying a hydrophilic product substantially without drift to a target area, said method comprising the steps of:

forming a thin invert water-in-oil emulsion comprising by weight a mixture of 15 to 50% oil phase, 1 to 5% emulsifier/surfactant, 50 to 80% water phase, and at most 5% of at least one additive for regulating an attribute of the composition selected from the group consisting of viscosity, surface resistance, pH, odor, and intra-ingredient compatibility, said water phase containing an active hydrophilic product of up to 75% by weight of the water phase;

particulating at least a portion of said emulsion to produce substantially uniform droplets having a maximum mean droplet diameter of about 1000 micrometers, said droplets comprising an oil phase surrounding a water phase, which water phase contains said hydrophilic product, said emulsion having viscosity which permits said particulation to occur through a small orifice nozzle means; and, applying said particularized droplets to said target area.

12. The method according to claim 11, wherein the particularization is performed by flowing the emulsion through at least one nozzle having an orifice size of at most about 0.02 inch, at a flow rate of about 0.1 liter per minute per orifice at ambient temperatures of about 60-90 degrees F.

13. The method according to claim 11, further comprising at least one of reconstituting and regulating viscosity of the emulsion by agitation.

14. The method according to claim 11, wherein said hydrophilic product is selected from the group consisting of hydrophilic herbicides, insecticides, fungicides and plant growth regulators.

15. The method according to claim 11, wherein said hydrophilic product is a water soluble or water miscible amine.

16. The method according to claim 11, wherein said emulsion comprises a ratio of at least about one part oil to about 3-5 parts water by weight.

17. The method according to claim 11, wherein said emulsion is applied at a rate of about 1-5 gallons per acre of growing crops.

18. The method according to claim 11, wherein said invert emulsion comprises, by weight, about 15-30% oil and balance water and hydrophilic product.

19. The method according to claim 11, wherein said oil phase comprises an oil selected from the group consisting of naphthenic oils, paraffinic oils and vegetable oils.

20. The method according to claim 11, wherein said emulsion comprises, by weight, about 15-30% oil, 50-70% water, 5-20% hydrophilic product and 1-5% emulsifier.

* * * * *

UNITED STATES PATENT AND TRADEMARK OFFICE
CERTIFICATE OF CORRECTION

PATENT NO. : 5,248,086
DATED : September 28, 1993
INVENTOR(S) : John E. Waldrum and Roy R. Johnson It is certified that error appears in the above-indentified patent and that said Letters Patent is hereby corrected as shown below:

Column 4, line 33, change "a" to read --as--.

Column 7, line 35, replace "Pump means 65 (see FIG. 3) is" with --Pump means 64 and/or 65 (see FIGS. 3-4) are--.

Column 7, lines 42-43, delete "The first and second ... fitting 23" and insert --The second conduit 75 has an inlet 77 communicating with the reservoir via nipples 24, 27 of central fitting 23.--

UNITED STATES PATENT AND TRADEMARK OFFICE
CERTIFICATE OF CORRECTION

PATENT NO. : 5,248,086
DATED : September 28, 1993
INVENTOR(S) : John E. Waldrum and Roy R. Johnson It is certified that error appears in the above-indentified patent and that said Letters Patent is hereby corrected as shown below:

Column 7, lines 46-48, delete "A valve 83 ... are controllable for" and insert --A valve configuration 83 (FIG. 3), and/or a particular pump arrangement (FIGS. 3 and 4) are controllable for--.

Signed and Sealed this

Nineteenth Day of April, 1994

Attest:

BRUCE LEHMAN

Attesting Officer

Commissioner of Patents and Trademarks